(12) United States Patent
Harms et al.

(10) Patent No.: US 10,197,043 B2
(45) Date of Patent: Feb. 5, 2019

(54) AIRCRAFT BEACON OF A WIND TURBINE

(71) Applicant: Wobben Properties GmbH, Aurich (DE)

(72) Inventors: Stephan Harms, Upgant-Schott (DE); Erich Stürenburg, Aurich (DE); Daniel Reiter, Aurich (DE); Matthias Köcklar, Hage (DE)

(73) Assignee: Wobben Properties GmbH, Aurich (DE)

(*) Notice: Subject to any disclaimer, the term of this patent is extended or adjusted under 35 U.S.C. 154(b) by 0 days.

(21) Appl. No.: 15/773,942

(22) PCT Filed: Nov. 7, 2016

(86) PCT No.: PCT/EP2016/076796
§ 371 (c)(1),
(2) Date: May 4, 2018

(87) PCT Pub. No.: WO2017/077102
PCT Pub. Date: Mar. 11, 2017

(65) Prior Publication Data
US 2018/0340518 A1    Nov. 29, 2018

(30) Foreign Application Priority Data
Nov. 6, 2015 (DE) .................... 10 2015 119 057

(51) Int. Cl.
*F03D 80/10* (2016.01)
*G08G 5/00* (2006.01)

(52) U.S. Cl.
CPC .......... *F03D 80/10* (2016.05); *G08G 5/0095* (2013.01); *F05B 2240/14* (2013.01); *F05B 2240/912* (2013.01)

(58) Field of Classification Search
CPC .......... F03D 80/10; B64D 47/00; G01W 1/00
USPC ............... 340/982, 983, 601, 945, 953, 964
See application file for complete search history.

(56) References Cited

U.S. PATENT DOCUMENTS

| 8,395,526 | B2 | 3/2013 | Kensy et al. | |
| 2009/0289804 | A1* | 11/2009 | Carstensen | F03D 80/10 340/601 |
| 2010/0156303 | A1* | 6/2010 | Wulff | F03D 80/10 315/152 |
| 2010/0194603 | A1* | 8/2010 | Wobben | F03D 80/10 340/983 |
| 2011/0194283 | A1 | 8/2011 | Röer | |

(Continued)

FOREIGN PATENT DOCUMENTS

| DE | 202009018539 U1 | 4/2012 |
| EP | 2053239 A1 | 4/2009 |
| EP | 2320126 A1 | 5/2011 |

*Primary Examiner* — Tai T Nguyen
(74) *Attorney, Agent, or Firm* — Seed IP Law Group LLP

(57) ABSTRACT

An aircraft beacon device for a wind power installation having a nacelle and a tower supporting the nacelle is provided. The aircraft beacon device includes a plurality of beacon lights, a central control unit for individually controlling the beacon lights, and a transmission system having an energy distribution system for individually supplying electrical energy to the beacon lights to operate the beacon lights. The transmission system has a data bus system for individually controlling the beacon lights, and the data bus system carries control data between the central control unit and the beacon lights.

16 Claims, 8 Drawing Sheets

(56) References Cited

U.S. PATENT DOCUMENTS

2011/0241926 A1 10/2011 Laufer
2014/0377060 A1 12/2014 Quell

* cited by examiner

AIRCRAFT BEACON OF A WIND TURBINE

BACKGROUND

Technical Field

The present invention relates to an aircraft beacon device for a wind power installation and the present invention relates to a method for operating a wind power installation and to a wind power installation having an aircraft beacon device.

Description of the Related Art

Aircraft beacon devices are known and are increasingly also required on wind power installations in order to improve the visibility of wind power installations for air traffic. Beacon lights are arranged at least at two positions on the nacelle of a wind power installation. In the case of wind power installations, the problem exists of rotor blades being able to conceal the aircraft beacon. As a result of the fact that beacon lights are arranged at at least two positions on the nacelle at a distance from one another, at least one is not concealed by a rotor blade. In addition, beacon lights may also be arranged on the tower, that is to say on the tower wall. This may occur, in particular, in the case of very high wind power installations.

A problem arises in this case for the manufacturers of wind power installations, in particular, in that, for such aircraft beacon devices, very different rules and therefore technical requirements are imposed on the aircraft beacon device depending on the region and, in particular, depending on the state in which the relevant wind power installation is erected. These different requirements include requirements imposed on intensity, also depending on the time of day, and requirements imposed on the emission direction, in particular on the emission angle range based on the vertical direction. In this case, such requirements both with regard to the emission angle range and with regard to the intensity are often combined and are predefined as characteristics with tolerance ranges.

If a wind power installation is now designed, the aircraft beacon device provided must be adapted to the rules and conditions of the planned erection site. The situation may also occur in which a plurality of wind power installations differ only in terms of the aircraft beacon device.

If the wind power installation manufacturer does not produce the aircraft beacon devices himself, the manufacturer passes the corresponding requirements imposed on the respective aircraft beacon device to the manufacturer of such aircraft beacon devices. Accordingly, an individual aircraft beacon device can then be produced. If appropriate, it comes into consideration that there are already corresponding aircraft beacon devices for the relevant country and the corresponding boundary conditions of the erection site or of the wind power installation, for example the height of the wind power installation and its distance from an airport. However, the variety is wide and it is also necessary to take into account that rules and conditions change, which likewise results in new requirements imposed on the aircraft beacon device and accordingly could make it necessary to develop a new aircraft beacon device.

Aircraft beacon devices which use many light-emitting diodes as luminous means are already known and have become conventional nowadays. This makes it possible to simplify the change to such an aircraft beacon device, with the result that the holding of different aircraft beacon devices can also be simplified and at least can also be less costly.

A further problem of known aircraft beacon devices is also that the additional use of beacon lights on the tower and their coordination with the beacon lights on the nacelle makes such aircraft beacon devices more complex and therefore also increases the range of variation. In this case, such a range of variation may affect not only the different physical elements of such an aircraft beacon device but also the control required in each case. In this case, it may not only be problematic to actually take into account the control diversity depending on the requirement but also to ensure that the beacon lights are each controlled using the controller provided for them.

In the priority application for the present application, the German Patent and Trade Mark Office researched the following prior art: DE 20 2009 018 539 U1 and EP 2 320 126 A1.

BRIEF SUMMARY

With regard to a wide range of variation in aircraft beacon devices, a solution is provided that is prone to faults as little as possible.

An aircraft beacon device is provided. Such an aircraft beacon device is intended for a wind power installation having a nacelle and a tower supporting this nacelle. The aircraft beacon device comprises a plurality of beacon lights. In particular, at least one beacon light may be provided as a daytime beacon and one beacon light may be provided as a night-time beacon. In particular, provision is made of two daytime beacons and two night-time beacons which accordingly also emit light at different times, namely the daytime beacon during accordingly bright daylight and the night-time beacon fundamentally in the evening or at night after sunset. In particular, these beacon lights are arranged in groups at a distance from one another such that at most one group can be covered by a rotor blade of the wind power installation.

A central control unit is also provided in order to individually control the beacon lights. The central control unit is therefore intended to control a plurality of beacon lights, in particular all beacon lights, of the aircraft beacon device. In this respect, the central control unit may not only have a central task but may also be arranged in a considerably central manner.

Provided is a transmission system having an energy distribution system and a data bus system. In this case, the energy distribution system is intended to individually supply electrical energy to the beacon lights in order to operate them. The data bus system individually controls the beacon lights, the data bus system transmitting control data between the central control unit and the beacon lights. A data bus system which accordingly has a data bus or is a data bus is therefore proposed. An example of a data bus is a field bus which is distinguished, in particular, by a robustness to environmental influences such as temperature fluctuations and electromagnetic interference.

Accordingly, both energy and control signals are supplied to the beacon lights.

The data bus system now makes it possible to transmit different data from the central control unit to the various beacon lights in a flexible manner. The use of a data bus system having appropriate transmission protocols makes it possible to provide the data and transmit the latter, in principle, independently of the specific beacon light. A common and, in this respect, also standard bus system which can transmit the wide variety of control data can be provided. Such a data bus system may, in principle, be independent of the specific conditions which must be met by the relevant beacon device. In particular, the data bus system may not only be independent of the respective type of emission but may also be independent of the number of beacon lights which have to be controlled. There may only be a need for further connection lines in the case of correspondingly more beacon lights if the transmission is carried out in a wired manner. The fundamental preprocessing of the corresponding control data for transmission may remain unchanged. Only the contents, including contents of the signal, which are needed to assign the corresponding data, change.

The corresponding beacon light may also respectively have a standard connection including an evaluation unit for receiving and evaluating the control data.

A generalized but nevertheless powerful system is provided in this respect. Beacon lights can be controlled as needed.

The energy distribution system can also be generalized in this respect.

The beacon lights can now be adapted to the respective prerequisites of the intended erection site. Insofar as this relates to the number and selection of corresponding lights, that is to say, in particular, whether a special beacon is also required in addition to daytime and night-time beacons, also including an infrared beacon, and whether and how many beacon lights are provided for the tower, corresponding beacon lights must be assembled. However, if the requirements can be achieved by means of appropriate control, that is to say can be varied in comparison with other requirements, a software adaptation is sufficient. The changed control signals are accordingly adapted and can be transmitted to the corresponding beacon lights by means of the data bus system. The fundamental structure of the data bus system, including the transmission protocol, remains unaffected by this. Only the contents are changed from the point of view of the data bus system. Moreover, the use of a data bus system also simplifies the implementation and performance of the corresponding control of the aircraft beacon device by means of computers, process computers or other data processing systems.

One embodiment proposes that the central control unit is arranged in the interior of the wind power installation, in particular in the nacelle. As a result of this, the central control unit can control the beacon lights centrally from the interior of the wind power installation. In particular, a plurality of beacon lights arranged in a distributed manner on the installation, in particular on the nacelle, can be centrally combined in this central control unit. As a result, the central control unit is protected from weather influences and can also be reached more easily by service personnel. This also makes it possible to adapt the control. Beacon lights may likewise possibly be added or removed again. The overall structure of an aircraft beacon device is considerably simplified thereby because the beacon lights have to be arranged and fastened only at the corresponding positions on or at the wind power installation and otherwise a connection to this central control unit can be centrally effected in the interior, in particular in a wired manner.

This implementation is simplified, in particular, by the use of the data bus system. At the same time, it is also possible to provide different aircraft beacon devices having the same central control units. In this case, it may suffice for any adaptations for the control to be able to be implemented by means of appropriate software or an appropriate parameter change in the central control unit.

One embodiment proposes that a plurality of beacon lights are respectively connected to form a beacon body. In addition, two or more beacon bodies are provided, and the beacon lights of at least one respective beacon body can be individually controlled.

In particular, two beacon bodies can be arranged at the top of the nacelle of the wind power installation and may be spaced apart such that at most one of the beacon bodies is covered by a rotor blade during rotation of the rotor of the wind power installation. However, it is also possible to provide further beacon bodies, for example on the tower.

Individually controlling the beacon lights makes it possible to respectively adapt the beacon lights and therefore also the corresponding beacon bodies to the current situation. Such a current situation includes, on the one hand, the installation situation, that is to say, for example, whether the beacon body is arranged at the top of the nacelle on a right-hand side or is arranged at the top of the nacelle on a left-hand side. This can relate, for example, to a viewing direction on the nacelle in the direction of the rotor. Such an installation situation will usually not change for a wind power installation but should nevertheless be taken into account.

With this installation situation, one consideration may be, for example, that the beacon body and its beacon lights are controlled in such a manner that they illuminate only an area of 270 degrees depending on the position. The other beacon body accordingly arranged on a different side of the nacelle may likewise be controlled in such a manner that it illuminates only 270 degrees. These two beacon bodies then together computationally illuminate an area of 540 degrees, namely an area of 360 degrees, of which an area of 180 degrees, namely usefully to the front, is illuminated twice. Therefore, the area to the front, in which the problem namely exists of a beacon body being able to be covered by a rotor blade, is illuminated twice.

The aircraft beacon device can therefore be provided for this situation. This is because two identical beacon bodies can be arranged on the nacelle of the wind power installation, to remain with the above-mentioned example, which beacon bodies are accordingly individually controlled only by the central controller.

In addition, the respective time of day can also be taken into account in the control. The illumination bodies as such do not need to carry out any adaptation whatsoever, and any consideration of times of day, for example with further consideration of seasons, can be implemented by the central control unit.

Provision is preferably made for beacon lights of a respective beacon body to be able to be individually exchanged. As a result, beacon bodies can be easily assembled with the respectively required beacon lights. Such individual exchangeability may also be advantageous in the case of repairs or maintenance to be carried out if the relevant beacon light can be exchanged with another structurally identical beacon light.

Provision is particularly preferably made for beacon lights to each be able to be replaced with a beacon light of another of the two or more beacon bodies. Accordingly, it is proposed that a plurality of beacon bodies of the aircraft beacon are structurally identical and at least that their beacon lights are each structurally identical. It need not apply to all beacon bodies of the aircraft beacon, but could apply, in particular, to two beacon bodies to be arranged at the top of the nacelle. For example, it is possible to provide two beacon bodies each having a red beacon light for night-time operation and each having a white beacon light for daytime operation. Provision may therefore be made for the red beacon lights to be able to be exchanged with one another and for the white beacon lights to be able to be exchanged with one another here. In particular, these exchangeable beacon lights may be structurally identical, but may illuminate different sectors during operation depending on control. This can be achieved by respectively individually controlling the beacon lights. The beacon lights can therefore initially have an identical structure and may each be combined with other beacon lights to form a beacon body. The respectively required emission characteristic can then be achieved by means of individual control.

Beacon lights of a beacon body are preferably placed on top of one another in the form of a stack. A beacon body can therefore be produced by placing the respectively provided beacon lights, that is to say, for example, a red beacon light for night-time operation and a white beacon light for day-time operation to remain with the above example, on top of one another. In particular, these beacon lights are connected to one another, in particular screwed to one another. This makes it possible to produce such a beacon body, possibly with further additional elements.

One embodiment proposes that a bus system without addressing is used as the bus system of the transmission system.

A bus system without addressing has, in particular, the following features. A fitter, service engineer or maintenance person can exchange the equipment, which is intended to be controlled via the bus system or is intended to be incorporated in the bus system, for a structurally identical item of equipment without making further adjustments to the equipment. There is no need to make any adjustment to the equipment for this purpose: for example, a DIP switch does not need to be set. Internal addresses are automatically allocated by a superordinate controller. In this respect, a bus system without addressing can be understood as meaning that the units to be respectively controlled or incorporated, that is to say the equipment mentioned, do not require any address stipulated in terms of hardware. This makes it possible to simplify both installation and maintenance and any repair. Costs can be saved and susceptibility to faults can also be reduced.

One configuration proposes that the aircraft beacon device comprises at least one, a plurality of or all elements in a list of elements explained below. This list of elements namely comprises an upper beacon light for arrangement on the nacelle. It also comprises at least one beacon body which has a plurality of beacon lights and is arranged on the nacelle. This list also comprises at least one lateral beacon light for arrangement on the tower. It is therefore also possible to achieve illumination there in the case of particularly high towers.

An additional beacon light and/or an additional beacon body for arrangement on the nacelle is/are respectively preferably provided as an element in the above list of elements. Accordingly, at least two beacon lights or two beacon bodies would then be provided on the nacelle. The list also comprises a visual range measuring device. Visual ranges can be recorded using said device and control of the aircraft beacon device can then be adapted on the basis of these values. In the case of poor visibility, the lights can therefore be controlled in such a manner that they emit brighter light. However, it also comes into consideration that the emission characteristic is changed on the basis of this without infrared emission additionally being activated in the case of poor visibility.

These elements in the list can therefore be provided alone or in combination with at least one further element. A combination of all of these elements also comes into consideration.

These elements may preferably each be connected to the central control unit adaptively and independently of further elements in the list of elements and may be controlled by the central control unit.

At least one, a plurality of or all elements in this list of elements can each preferably be connected to the central control unit adaptively and independently of further elements in the list of elements. This can be implemented via the proposed bus system. Using a bus system without addressing makes it possible to carry out such an adaptation. Only the corresponding element needs to be added and the central control unit can output or distribute the relevant data via the bus system and the corresponding elements, in particular an element which has been added, can accept the data from the bus system and can be controlled thereby.

One embodiment proposes that a plurality of or all elements in the list of elements mentioned, which comprises the aircraft beacon device, are each connected to respectively identical sockets via lines having an identical plug, the plugs being able to be exchanged between the sockets without influencing the functionality of the elements which are connected thereby. The respective elements therefore each have some of these identical sockets. The aircraft beacon device can therefore be installed in a simple manner because there is no need to pay attention to any correct assignment of the corresponding lines to the corresponding elements. The aircraft beacon device which has been completely installed can be appropriately controlled via the data bus system. The respective data can be assigned to the respective element, in particular the respective beacon light, by means of the protocol used in said system. The described exchangeability of the lines to be connected preferably exists between the individual beacon lights. However, provision may also be made for a beacon body, which has a plurality of beacon lights and possibly also one other element or a plurality of other elements, to be connected via only one connection via which all beacon lights and possibly further elements of this beacon body can be controlled. In this case too, the different data can be assigned to the different beacon lights or to the further elements using a protocol of the data bus system or using other identification possibilities of the data bus system.

The described connection via the lines mentioned is provided, in particular, for a control connection between the central control unit and the respective elements. However, it also comes into consideration that an intermediate element, for example a hub, is provided. In any case, it is possible to achieve simple installation and, at the same time, to avoid faults during connection.

At least one of the described elements respectively preferably has an energy transmission connection and a data transmission connection in a cable with a common plug. It is therefore proposed to combine the energy transmission and the data transmission in one cable and also to provide a common plug therefor. This also makes it possible to simplify installation, in particular. The use of a data bus system makes it possible to prevent or at least detect inadvertent influences between energy transmission and data transmission using security queries, for example. The use of a data bus system and therefore the use of digital transmission means that the risk of an analog signal being changed does not exist.

Another configuration proposes that electrical energy for operating the aircraft beacon device and additionally or alternatively control data is/are transmitted from a central energy supply unit and/or the central control unit to the respective beacon lights using at least one distribution device and is/are possibly also transmitted to at least one element in the list of elements mentioned above. In this case, the energy, that is to say the electrical current for supplying the respective elements, can initially be centrally provided by the central energy supply unit; in particular, if two beacon bodies which are at a distance from one another are used on the nacelle, the energy for both beacon bodies can initially be centrally provided as far as the distribution device. The distribution device can then divide the energy distribution, in particular only in the vicinity of the beacon bodies. Such a supply of energy is preferably looped through a distribution device, with the result that some of the energy is removed at this energy distribution device and is supplied to elements, in particular beacon lights. The remaining energy can initially also be combined and can be forwarded to the next beacon body, for example, in which distribution using a further distribution device can be provided. Such a distribution device may preferably also perform protection functions. Such a distribution device can therefore be used not only to distribute the energy but also to limit it.

Additionally or alternatively, it is proposed that the distribution device, or simply the distributor, is also used to transmit data. Therefore, data can then also be easily transmitted and distributed. According to one embodiment, a combination with the energy distribution is proposed, with the result that both can be combined. In particular, the distributor may also have the following features:

The distributor may be in the form of an intelligent distributor which provides diagnostic data via the field bus. The diagnostic data may include input current and/or voltage and the output current, to name only two examples. These data may be acquired and evaluated in order to detect the state and possibly a fault of the connected elements, for example the beacon light.

Configurable fuses are preferably proposed, a tripping current and/or a tripping characteristic of which can respectively be set, in particular, depending on the connection provided. It is therefore possible to provide a plurality of connections, including different connections, for which the electronic fuse is then respectively configured depending on the use. A range of 0-16 Amperes (A) is proposed as the tripping current range. The tripping characteristic can be determined via an adjustable tripping characteristic curve.

There is preferably an input having a connection for EtherCat via fiber-optic lines, from which the data which are received via such a field bus can be converted for further transmission to the beacon lights via copper cables.

One configuration proposes that at least one of the beacon lights is configured to be controlled using control commands via the data bus system and to continue to operate autonomously in the event of an interruption in the data bus system. The beacon light preferably continues to operate according to the last command or according to a control program stored in the respective beacon light. The aircraft beacon device can therefore continue to be operated, even in the event of an unlikely failure of the data bus system, at least in such a manner that a collision between an aircraft and the wind power installation, on which the aircraft beacon device is installed, is avoided. Continued operation according to the last command should at least prevent the aircraft beacon device from switching off or the relevant beacon light from switching off if it no longer receives a command. Instead, it is at least ensured that the beacon light continues to be operated.

In the embodiment which provides for continued operation on the basis of a stored control program, such control of the beacon light, in particular, may provide for the beacon light to be controlled in the first place such that a collision of an aircraft with it is avoided. Considerations of controlling the aircraft beacon devices such that they disrupt the environment to a lesser extent, for example, can take a backseat in this exceptional case.

If the bus system fails, which may also comprise failure of a master, it is therefore proposed, as a solution, to continue to operate the relevant beacon light or the relevant beacon lights with the aid of a control program. In this case, such a control program can be oriented, in particular, to the time and/or brightness and can accordingly continue to operate the relevant beacon light(s) for a while, usually without any special restrictions.

Not only the beacon light or a plurality of beacon lights, but rather at least one beacon body is preferably prepared to be controlled using control commands via the data bus system and to continue to operate in the event of an interruption. The effects described above in this respect with regard to the beacon lights analogously also apply to the beacon body or bodies in this embodiment. As a result of the narrow structure of a beacon body comprising a plurality of beacon lights, a transmission fault cannot be expected there or can be less expected there and it therefore comes into consideration that a beacon body having a plurality of beacon lights continues to operate autonomously in the event of a fault.

At least one of the beacon lights is preferably configured to emit light approximately horizontally all around in 360°. In this respect, this can be understood as meaning a physical preparation, with the result that luminous means, in particular light-emitting diodes, are therefore provided for emitting light in 360°. At least one ring fitted with light-emitting diodes or other luminous means is accordingly provided, in particular, or the luminous means are arranged in an annular manner. For this purpose, it is now proposed that the at least one beacon light can be controlled via the data bus system in such a manner that it emits light only in a section of these 360°, in particular only in a sector of 90°, 180° or 270°. A beacon light is preferably subdivided into individual sectors in order to prepare to emit light in such individual sectors. Such subdivision into individual sectors, for example 10°, 20°, 30°, 45° or 90° sectors, may be configured in such a manner that all LEDs in such a sector are respectively combined in such a manner that they are controlled together, with the result that light is emitted in the corresponding sector. Such a beacon light is therefore configured to be controlled via the data bus system in such a manner that it emits light in one or more of the individual sectors and/or in 360°, 270°, 180° or 90°.

The beacon light can therefore preferably be subdivided into individual sectors but can emit light in 360°, 270°, 180° or 90° as standard, depending on the control.

The emission of light can therefore be adjusted and can be adapted to the respective requirement. Such an adaptation to the situation may be an instantaneous situation, for example if the aircraft beacon device is switched on only when required, namely when an aircraft approaches a particular sector.

However, this situation may also depend on a fundamental installation situation. In particular, a 270 degree sector may be respectively provided for two beacon bodies arranged at a distance on the nacelle. As a result, it is possible to achieve the situation overall for these two beacon bodies in which they both emit light up to 180° to the front, namely in the direction of the rotor of the wind power installation, with the result that this area of 180° to the front is illuminated twice. This makes it possible to take into account the fact that one of the two beacon bodies may be briefly concealed by a rotor blade of the rotating rotor. To the rear, away from the rotor, the area of 180° needs to be illuminated only once. The two beacon bodies can accordingly divide these 180° into 90° each.

It is additionally or alternatively proposed that at least one of the beacon lights is prepared to emit light with a plurality of different characteristics, in which case it is controlled via the data bus system in such a manner that it emits according to one of these characteristics. Such different emission characteristics relate, on the one hand, to horizontal illumination profiles, but may also relate to the light intensity, on the other hand. Both may depend on the site and may often also be given by local rules. However, the same aircraft beacon devices, and at least the same beacon lights, may now be provided for different sites with different requirements imposed on the emission characteristic. The wind power installation may accordingly be universally equipped with such an aircraft beacon device. The corresponding characteristics can then be selected only by means of the control via the data bus system and therefore by means of consideration in the central control unit. This also makes it possible to make adaptations if rules which prescribe a different emission characteristic, for example, change.

The aircraft beacon device is preferably configured to read a remaining service life for one, a plurality of or all of the beacon lights. A remaining service life is calculated, in particular, according to the previous operating hours for which the corresponding element was operated. Furthermore, extreme situations may appear, for example if the aircraft beacon device was operated with a high current which shortens the service life. However, the remaining service life can also be calculated in the beacon light and/or the beacon body. These data, in particular the operating times of each beacon light, can be recorded and can also be easily retrieved via the bus system. It is then possible to know such a remaining service life and to accordingly provide for the relevant elements, in particular the relevant beacon light, to be exchanged in good time. This reading and evaluation of the remaining service life can be combined in a particularly advantageous manner with a modular structure of a beacon body described above, in particular the embodiment in which beacon lights of a beacon body can be individually exchanged. In particular, in the case of beacon lights which can be placed on top of one another in the form of a stack to form a beacon body or part of the latter, only the beacon light affected can be easily exchanged if the remaining service life is identified. In particular, other elements of such a beacon body, such as an infrared light or a visual range measuring device, may have a considerably longer remaining service life in the event of little use, with the result that only a partial exchange of the beacon body is useful.

One embodiment proposes an aircraft beacon device which is characterized in that
- at least one of the beacon lights has a passage opening which runs vertically and completely through the beacon light and in which at least one connection plug for connecting at least one cable of the energy distribution system and/or for connecting at least one cable of the data bus system is arranged, and/or in that
- a beacon body has a plurality of beacon lights each with a passage opening, the passage openings of the plurality of beacon lights being combined to form a common cable duct.

A beacon light can therefore be in the form of a circular ring with the passage opening in the interior, in particular. However, other forms also come into consideration. The corresponding connection cables can therefore be routed through such passage openings to the respective connection plug. These connection cables and the relevant connection plugs are therefore well protected from weather influences. In addition, this also makes it possible to easily ensure that the connection cables in any case are arranged behind the luminous means and therefore do not hinder the lighting function.

If at least two such beacon lights are placed on top of one another to form a beacon body or part of the latter, for example a daytime beacon on a night-time beacon or vice versa, these passage openings may be combined to form a cable duct. For such a beacon body, provision may also be made for a further beacon light or one of the two beacon lights without a passage opening to be placed on. Such a beacon light without a passage opening can then form a termination of the beacon body, with the result that it closes or covers the passage opening of the beacon light underneath it. At the same time, however, at least one connection cable can be supplied to this further beacon light from below through the cable duct. Such a beacon light for termination may be a night-time beacon light, for example.

A method for controlling an aircraft beacon device is provided, where an aircraft beacon device according to one of the embodiments described above is being used and each beacon light is being individually controlled via the data bus system.

Such a method therefore advantageously uses the aircraft beacon devices described above.

Provided is a wind power installation which is equipped with an aircraft beacon device according to at least one of the embodiments explained above. Such a wind power installation can therefore easily meet requirements for the aircraft beacon. In particular, a great variety of aircraft beacon devices can also be achieved by virtue of the modular principle of the proposed aircraft beacon device. The wind power installations can therefore be easily adapted for different sites. Aircraft beacon devices which are physically structurally identical are often provided for wind power installations for different sites with different requirements imposed on the aircraft beacon and ultimately need to be adapted to the corresponding site only by means of appropriate programming. The manufacturing of a wind power installation is also made easier in this case. In addition, susceptibility to faults is also reduced because the assembly of incorrect components is avoided by virtue of the fact that the specific physical components are less important.

BRIEF DESCRIPTION OF THE SEVERAL VIEWS OF THE DRAWINGS

The invention is now explained in more detail by way of example using exemplary embodiments with reference to the accompanying figures.

DETAILED DESCRIPTION

Figure 1:
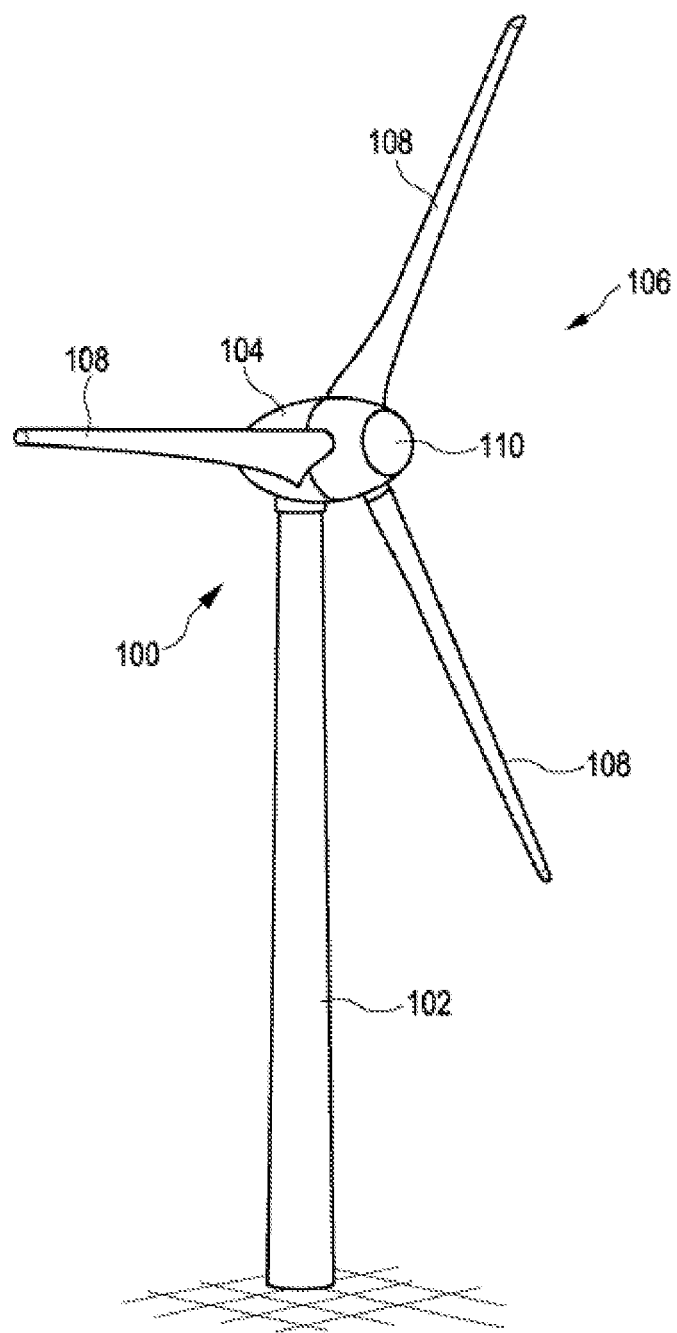
FIG. 1 shows a perspective view of a wind power installation.

FIG. 1 shows a wind power installation 100 having a tower 102 and a nacelle 104. A rotor 106 having three rotor blades 108 and a spinner 110 is arranged on the nacelle 104. The rotor 106 is caused to rotate by the wind during operation and thereby drives a generator in the nacelle 104.

Figure 2:
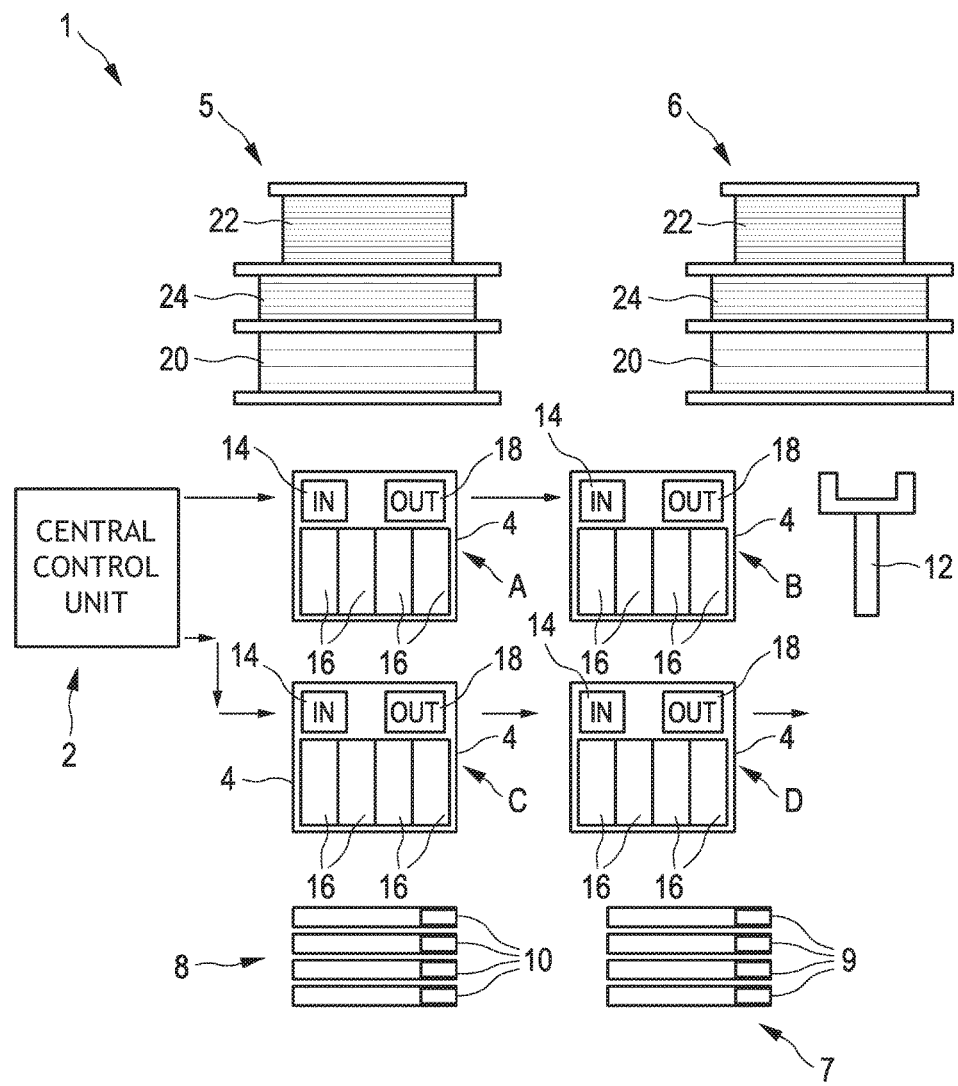
FIG. 2 schematically shows components of an aircraft beacon device.

FIG. 2 schematically shows elements of an aircraft beacon device, in which case an aircraft beacon device 1 which has not been installed is illustrated, but connecting lines or cables and some elements, such as fastening elements, are not illustrated in this schematic illustration. A central control unit 2 is schematically illustrated as a block. The same applies to the four illustrated distribution devices 4 which can also be referred to as distributors in a simplified form.

The aircraft beacon device 1 also comprises a first beacon body 5 and a second beacon body 6 which are intended to be arranged at a distance from one another on the nacelle 104 of a wind power installation 100.

The aircraft beacon device 1 shown in FIG. 2 also comprises a first set and a second set of lateral beacon lights 7 and 8 for arrangement on a tower, such as the tower 102, at different levels, with the result that a respective set of lateral beacon lights 7 or 8 is arranged at a respective level. For example, the first set of lateral beacon lights 7 can be arranged at half the tower height and the second set of lateral beacon lights 8 can be arranged at three quarters of the tower height. These are only two examples for illustration. In any case, the first set of lateral beacon lights 7 is intended for a lower level of the tower and the second set of lateral beacon lights 8 is intended for an upper level of the tower. Nevertheless, these two sets of lateral beacon lights 7 and 8 may be identical. Both sets here each comprise four lateral beacon lights 9 and 10 which are structurally identical in the example shown.

A visual range measuring device 12 is also provided in order to detect visual ranges which can be evaluated by or in the central control unit 2.

The aircraft beacon device 1 is now constructed in such a manner that the central control unit 2 can be accommodated in a main control cabinet. Such a main control cabinet can also provide a programmable logic controller (PLC) for controlling the elements of the aircraft beacon device 1. Furthermore, an uninterruptible power supply (UPS) may be provided in order to maintain the operation of the aircraft beacon device in the event of failure of the supply network. An energy supply is also provided in or at the central control unit 2, in particular in the main control cabinet mentioned. The aircraft beacon device 1 can therefore be both controlled and supplied with the corresponding energy centrally from this central control unit 2. Managing with only one control cabinet for the entire aircraft beacon device is made possible. Accordingly, it is also proposed to use only one control cabinet for the aircraft beacon device.

Energy can be supplied from the central control unit 2 in such a manner that corresponding current is supplied to an input 14, a distribution device 4 or distributor and is distributed via a plurality of supply connections 16. For example, a current of 40 A can be supplied for this purpose to the distribution device 4 which can respectively provide a current of 16 A at the supply connections 16.

An output 18 which can be used to pass electrical energy to a further distribution device 4 is additionally provided on the distribution device 4.

The four distribution devices 4 in FIG. 2 are structurally identical or can be at least structurally identical but are provided for different tasks in this case. In order to illustrate this, these distribution devices 4 are marked with the letters A to D for explanation. The distribution device 4 with the letter A is intended, for example, to respectively supply two daytime beacons and two night-time beacons, namely of the first beacon body 5 and of the second beacon body 6. Corresponding lines are not illustrated here for the sake of simplicity.

The distribution device 4 with the letter B may be intended to respectively supply a special beacon of the beacon bodies 5 and 6 and to supply the visual range measuring device 12. A fourth one of the supply connections 16 of this distribution device B can remain unused in this case.

The distribution device 4 with the letter C may be intended to supply the second set of lateral beacon lights 8. Current can be passed to the distribution device D from this distribution device C. This distribution device 4 with the letter D is then used to supply the first set of lateral light beacons 7 according to the embodiment shown. One of the lateral beacon lights 9 and 10 can be respectively supplied via a respective one of the supply connections 16.

The two beacon bodies 5 and 6 in the embodiment shown each have a daytime beacon light 20 and a night-time beacon light 22. Furthermore, a special beacon light 24 is provided in both beacon bodies 5 and 6, which special beacon light is provided here substantially as a beacon light which can emit light in the infrared range. Therefore, the daytime beacon lights 20, night-time beacon lights 22 and special beacon lights 24 respectively form one embodiment of a beacon light. These three lights are each combined to form a beacon body 5 or 6.

For example, each daytime beacon light 20 may have a power consumption of 15 A, whereas the night-time beacon light 22 and the special beacon light 24 may each have a power consumption of 2 A. Both beacon bodies 5 and 6 together therefore have a computational power consumption of 19 A. However, since the daytime beacon lights 20 and the night-time beacon lights 22 are operated at different times, it is possible to supply energy via two distribution devices 4. One distribution device 4, for example the distribution device marked with A, can therefore receive 40 A at the input 14 and can respectively output 15 A to two of the supply connections 16 during daytime operation. 10 A then remain and are forwarded, at the output 18 of this distribution device 4 designated A, to the distribution device 4 marked with B. The distribution device 4 marked with B can then use these remaining 10 A to readily supply the two special beacon lights 24 with 2 A each, and the visual range measuring device 12, which likewise consumes approximately 2 A during operation, can also be supplied.

Figure 3:
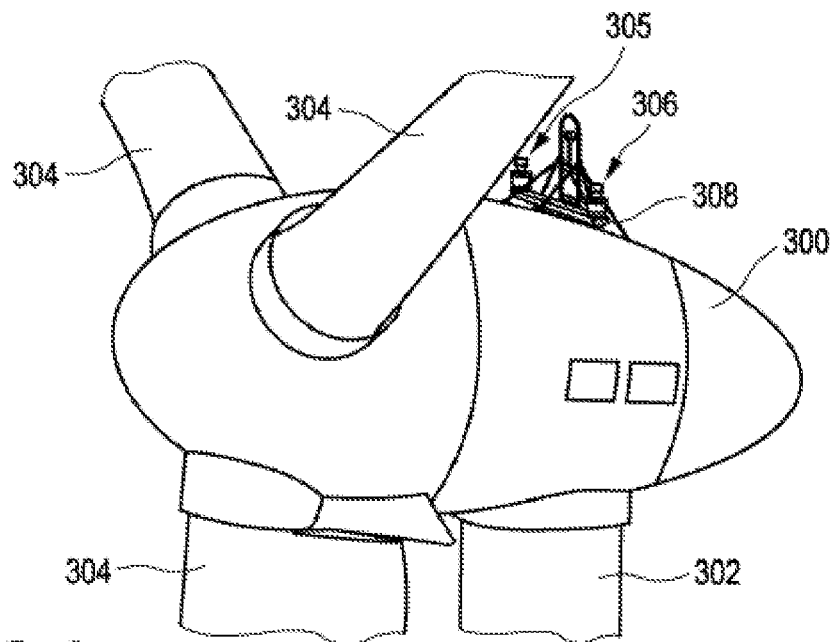
FIG. 3 shows a nacelle of a wind power installation with beacon lights thereon.

FIG. 3 shows a perspective view of a nacelle 300 which is arranged on a tower 302 and has three rotor blades 304. The tower 302 and the rotor blades 304 are illustrated in cropped form in the illustration in FIG. 3.

Figure 4:
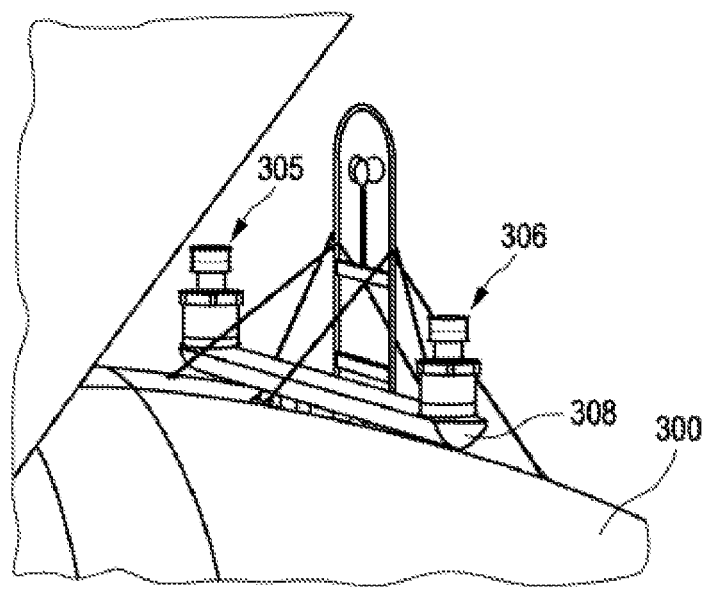
FIG. 4 shows an enlarged portion of FIG. 3.

Two beacon bodies 305 and 306 are illustrated on the nacelle 300 and are arranged on a common carrier 308, which is illustrated in the portion in FIG. 4.

The beacon bodies 305 and 306 may correspond to the beacon bodies 5 and 6 according to FIG. 2.

Figure 5:
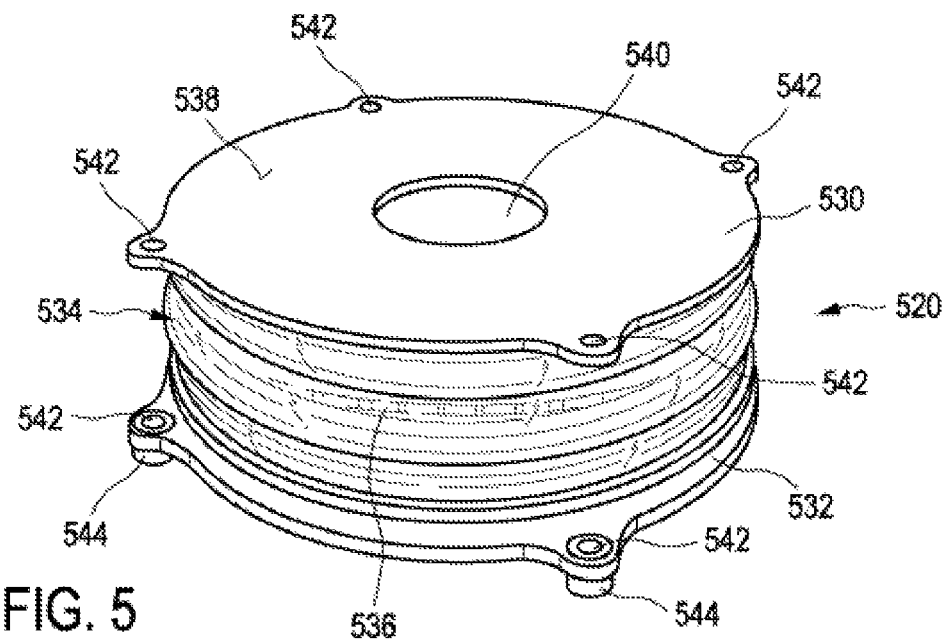
FIG. 5 shows a perspective illustration of a beacon light for a daytime beacon.

FIG. 5 shows a perspective view of one embodiment of a daytime beacon light 520 having an upper connecting plate 530 and a lower connecting plate 532. The illumination part 534 is situated in between, of which circumferential glass 536 can be seen, behind which luminous means, in particular LEDs, are arranged.

A connection to a further element, in particular a further beacon light, can be made using the upper and lower connecting plates 530 and 532. A connection to a carrier, such as the carrier 308, can also be made using the lower connecting plate 532.

The upper and lower connecting plates 530 and 532 are arranged in a plane-parallel manner with respect to one another in order to enable a connection in the form of a stack having one or more beacon lights and in order to ensure a straight structure in this case. A play-free connection to a further beacon light placed thereon can be achieved in this case via a planar surface 538 of the upper connecting plate 530. The lower connecting plate 532 likewise has a planar surface which cannot be seen in the perspective view in FIG. 5, however. Planar surfaces are likewise provided in further beacon lights, namely those which can be arranged on the upper connecting plate 530 and therefore on the planar surface 538.

A passage opening 540 is provided for the purpose of carrying on electrical lines both for supplying energy and for supplying data signals. Various fastening holes 542 are also provided for fixed fastening. Fastening feet 544 are also provided for fastening at a distance or for fastening on a carrier.

Figure 6:
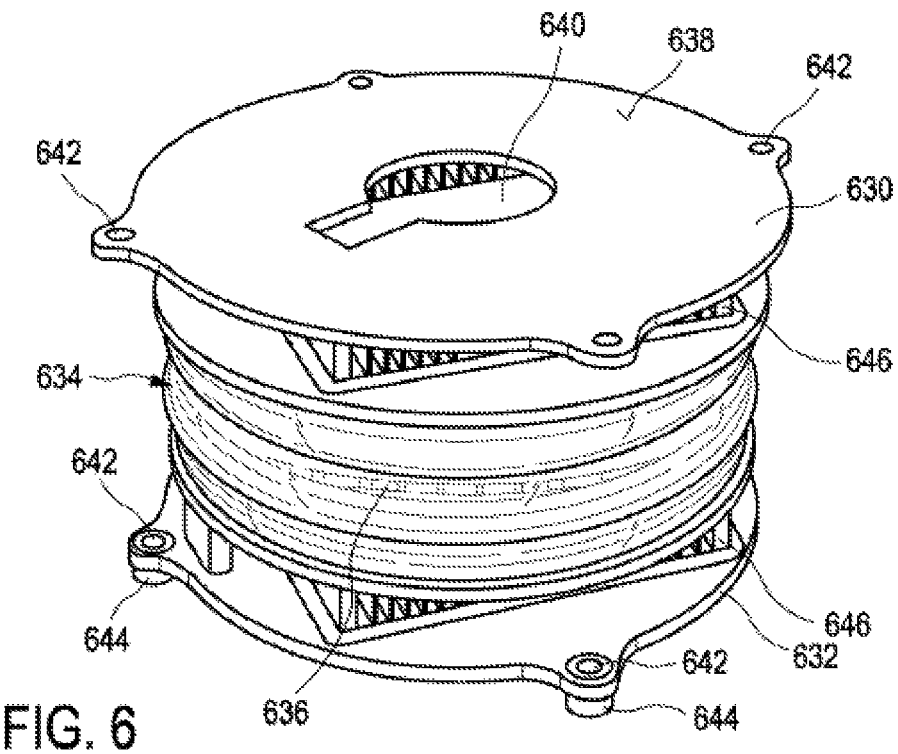
FIG. 6 shows a perspective illustration of a further embodiment of a beacon light for a daytime beacon.

FIG. 6 likewise shows a daytime beacon light 620 which corresponds substantially to the daytime beacon light 520 in FIG. 5. In this respect, it also has an upper connecting plate 630 and a lower connecting plate 632 and an illumination part 634 which is arranged in between and has corresponding circumferential glass 636. A planar surface 638 and a passage opening 640 as well as fastening holes 642 and fastening feet 644 are likewise provided.

Alternatively, provision may also be made for a plurality of beacon lights to be arranged on top of one another in such a manner that the fastening feet 544 or 644 are placed onto an upper connecting plate of another beacon light, thus producing a plane-parallel intermediate space between two planar surfaces. This makes it possible to achieve or improve a cooling effect in the case of which the corresponding connecting plates conduct heat and can radiate it into this intermediate space. If appropriate, attention should then be paid to a seal with respect to the passage openings 540 and 640. Connecting plates, that is to say upper and lower connecting plates, made of metal in particular, are therefore preferably provided so that they have good thermal conductivity and can also ensure a high degree of stability.

The important difference between the daytime beacon light 620 in FIG. 6 and the daytime beacon light 520 in FIG. 5 is that cooling means 646 in the form of heat sinks with cooling ribs are provided. This daytime beacon light 620 can therefore be provided, in particular, for operation with relatively strong illumination and/or relatively short pause times. If appropriate, such cooling means 646 can also be used to better implement applications in climatically warmer regions.

Figure 7:
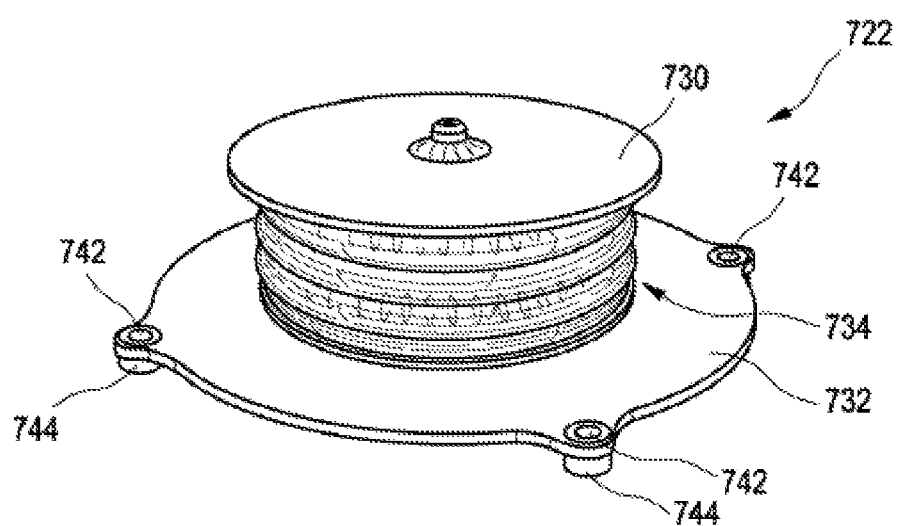
FIG. 7 shows a perspective illustration of a beacon light for a night-time beacon.

FIG. 7 shows an example of a night-time beacon light 722. It differs from the two daytime beacon lights 520 and 620, in particular, in that it emits red light, whereas the daytime beacon lights emit white light. The red emitted light is less energy-intensive and a considerably smaller supply of current can therefore be required, which has already been explained in connection with FIG. 2; however, a smaller design may also suffice for the illumination part 734.

Otherwise, this night-time beacon light 722 can have similar elements to the daytime beacon lights described herein. In particular, a lower connecting plate 732 is also provided here, the lower connecting plate having fastening holes 742 and fastening feet 744 in order to thereby be arranged and fastened on an upper connecting plate 530 or 630 of the daytime beacon light 520 or 620, for example.

Such a night-time beacon light 722 is usually the uppermost element or at least the uppermost beacon light of a beacon body and therefore requires only an upper covering plate 730 towards the top.

Figure 8:
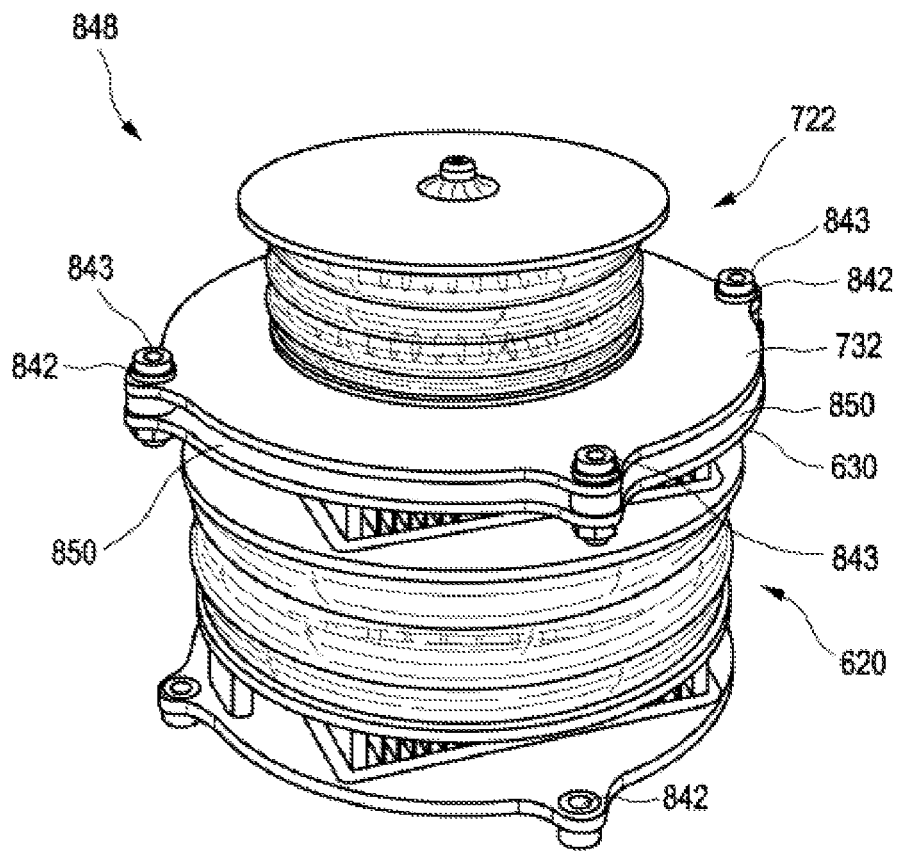
FIG. 8 shows a perspective illustration of assembly of the beacon lights according to FIGS. 6 and 7.

FIG. 8 now shows assembly of a night-time beacon light 722 on a daytime beacon light 620 according to FIG. 6. FIG. 8 therefore shows a beacon body 848. Alternatively, however, the night-time beacon light 722 could also be arranged on a daytime beacon light 520 according to FIG. 5. The connecting functions, in particular an adaptation of the lower connecting plate 732 to an upper connecting plate 630 or 530, are universal such that different combinations of different beacon lights can be readily achieved.

In this case, it can be seen in FIG. 8 that a plane-parallel intermediate space 850 is formed between the lower connecting plate 732 of the night-time beacon light 722 and the upper connecting plate 630 of the daytime beacon light 620.

Figure 9:
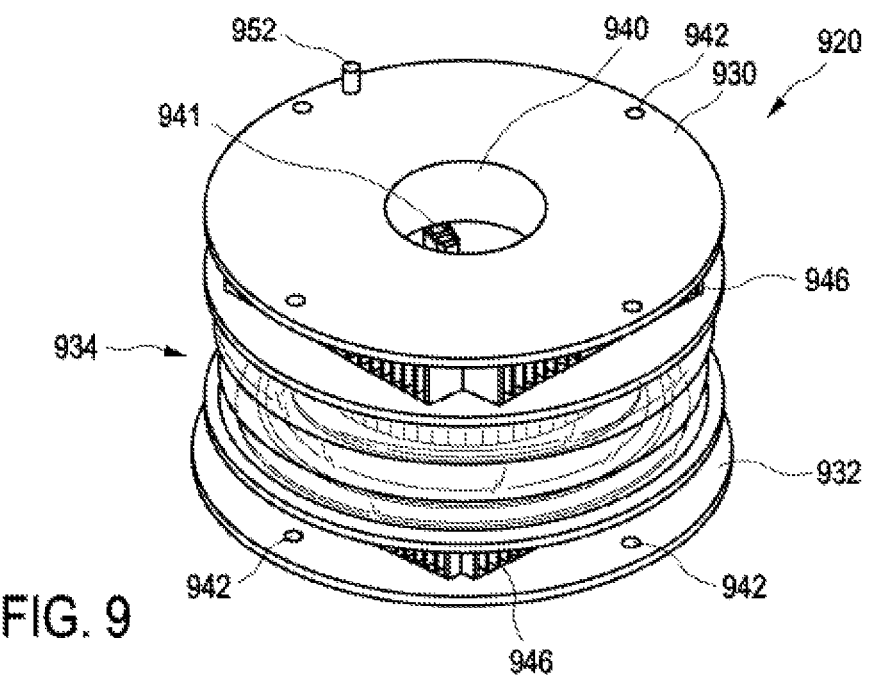
FIG. 9 shows a perspective lateral plan view of a further embodiment of a beacon light for a daytime beacon.

FIG. 9 shows a daytime beacon light 920 which differs from the daytime beacon light 620 substantially by virtue of the type of arrangement of the fastening holes 942 in the upper connecting plate 930 and the lower connecting plate 932. In this case, it was recognized, in particular, that the cooling means 946 also result in sufficient space towards the illumination part 934 such that the fastening holes 942 can be provided directly in the circular connecting plates 930 and 932. In addition, provision is made of a positioning pin 952 which, in particular when placing on a further beacon light, for example a night-time beacon light, can be used to determine the position of such an element which has been placed on. In the case of sectoral emission of light which can be flexibly changed by means of data bus control in particular, it is important for the relevant orientation of the affected beacon light to be determined.

A passage opening 940 in which a connection plug 941 for cable routing is indicated can also be seen in FIG. 9. The daytime beacon light 920 is therefore open in the center and the connection or connection plug 941 of the light is also situated there. This has the following advantages:

The cable can be connected in the light. As a result, the connection plug 941 and the relevant cable are additionally protected from the weather. Line paths do not conceal the light. The luminous intensity can therefore be used ideally.

Figure 10:
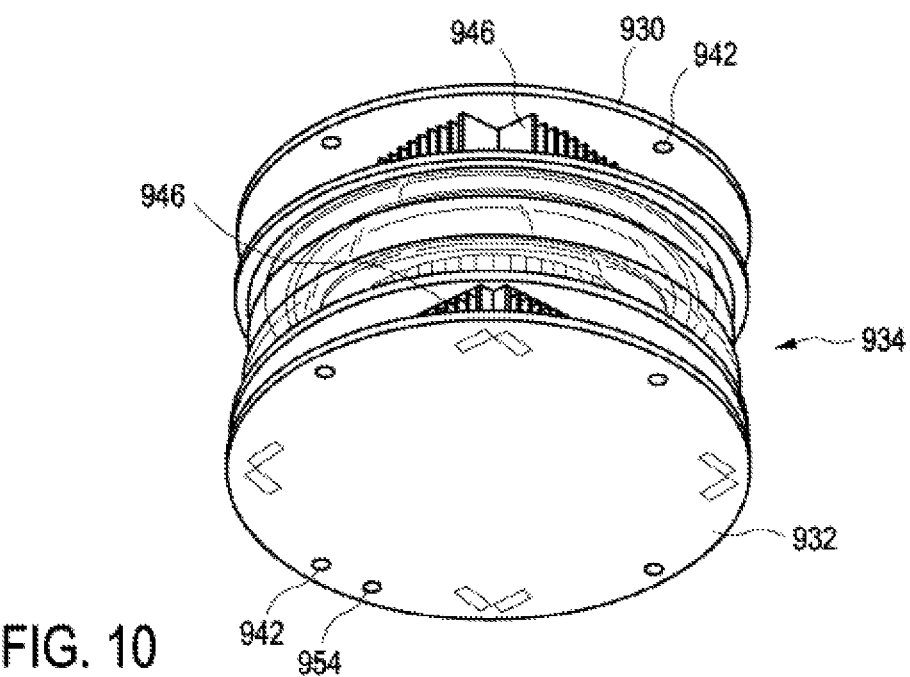
FIG. 10 shows a bottom perspective view of the beacon light from FIG. 9.

FIG. 10 shows a perspective illustration from below of the daytime beacon light 920 of FIG. 9. A positioning hole 954 which is adapted to a positioning pin, such as the positioning pin 952, can be seen there in the lower connecting plate 932.

Figure 11:
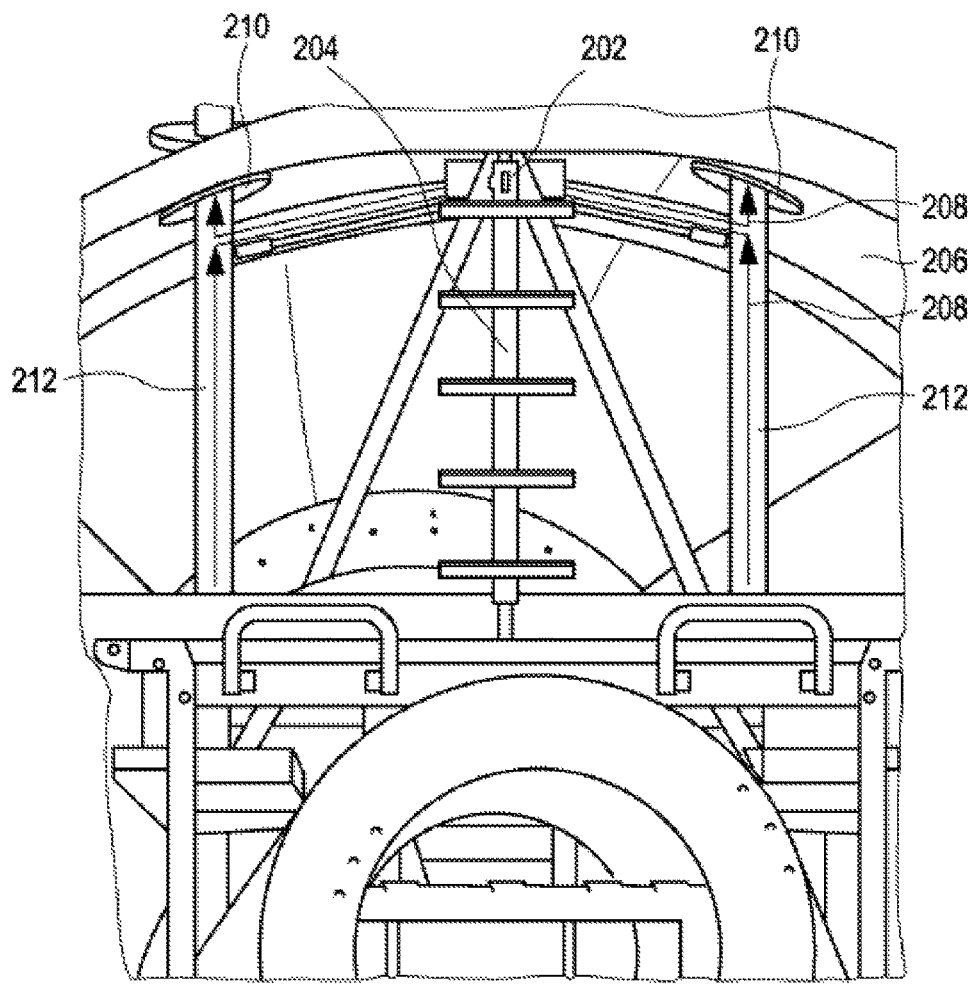
FIG. 11 shows a section of an interior of a nacelle with a central control unit of an aircraft beacon device.

FIG. 11 shows a section of an interior of a nacelle, for example the nacelle 300 of FIG. 3, in which a central control unit 202 is arranged. The latter is arranged there in the region of a ladder staircase 204. In this case, the central control unit 202 is arranged directly underneath a nacelle cladding 206 and can be reached via the ladder staircase 204.

Possible paths for cable connections from the central control unit 202 to beacon lights, beacon bodies or other elements of the aircraft beacon device are indicated as possible cable paths 208. A possible cable path 208 can therefore be routed from the central control unit 202 through a nacelle opening 210 through the nacelle cladding 206. Such a cable path or corresponding cable routing can be combined in this case with supporting columns 212 which are likewise routed to the outside through the nacelle cladding 206. These can be used to supply data and energy to aircraft beacon lights or beacon bodies arranged on the nacelle. In addition, they can be used to control a visual range measuring device and to supply it with energy, and information can also be returned from such a visual range measuring device to the central controller on the way.

A cable connection may also lead downwards along the same supporting column 212. This can be used to supply the central control unit 202 with energy. Information and energy can likewise also be passed in this way to lateral beacon lights which are to be arranged on the tower.

Provided herein is overall an aircraft beacon device which can be used and controlled in a flexible manner. It is also possible to provide different elements and a different number of elements without having to change or substantially change the remaining elements. In particular, it is proposed to adapt the aircraft beacon device 1 according to FIG. 2 to the corresponding conditions as required. In this case, individual elements, for example a set of lateral beacon lights, can be omitted. It also comes into consideration, for example, to omit a beacon light, for example the special beacon light 24, in the beacon bodies which are to be arranged on the nacelle, that is to say the beacon bodies 5 and 6 according to FIG. 2. Continuing with the example, through the omission of the special beacon light 24, the beacon bodies 5 and 6 from FIG. 2 can assume a structure which corresponds to that of the beacon body 848 from FIG. 8.

Beacon lights can therefore be connected to a distributor, such as the distributors 4, and can be connected to a data bus system and controlled. An EtherCat field bus is proposed as the data bus system. Since a large number of different fields of application and conditions exist for such aircraft beacon devices, the resulting complexity can preferably be achieved by combining a plurality of lights or light types. For selection, FIG. 2 shows an illustration with the largest possible structure. This structure comprises two night-time beacons, two daytime beacons, two special beacons, eight tower beacons and a visual range measuring device. The aircraft beacon device having these elements can be easily varied, in particular depending on the place of use and height of the tower, to name just a few examples. For example, a variation of the aircraft beacon device would be that only two night-time beacon lights and only two daytime beacon lights are present and would need to be connected. The remaining distributors could then be dispensed with, in particular the distributors 4 having the letters B to D. The proposed solution could achieve a high degree of flexibility and a cost-effective product as well as the possibility of fast services as a result of fast repairs and maintenance.

The distributors 4 have a 40 A input and four supply connections 16 to the loads, that is to say to beacon lights in particular, having a current output of up to 16 A. If the sum current of the loads is 20 A, for example, a further distributor can be positioned at the output 18. If loads having more than 16 A have to be connected, another accordingly adapted distributor can be used. Beacon lights may be configured to emit a plurality of emission characteristics. Such a possibility can be achieved by arranging a plurality of rows of light-emitting diodes. In particular, such rows of light-emitting diodes can be arranged circumferentially in a circular manner in order to be able to emit light in 360° overall. An offset of such rows of light-emitting diodes in the vertical direction, in particular based on a glass prism arranged in front, can result in a different emission characteristic depending on which of these rows of light-emitting diodes are controlled. A plurality of such rows of light-emitting diodes can also be controlled at the same time. This makes it possible to easily select an emission characteristic solely on the basis of appropriate control.

In particular, the beacon bodies, such as the beacon bodies 5 and 6 and the beacon body 848, can be composed of selected beacon lights. This can be easily carried out by means of screwing, as can be seen, for example, in FIG. 8 in the fastening holes 842 in the region of the parallel intermediate space 850. Screws 843 are used there for connection.

A preferred connection possibility can be provided by means of a hybrid cable which may have a 24 V connection, a 0 V connection, a PE connection and, for data transmission, an RJ 45 connection.

At least according to one or more embodiments, a connection of the beacon lights and other elements to a data bus system is provided. A data bus system without addressing is preferably used. It is also possible to achieve the situation in which the relevant beacon light can continue to emit light, in particular can continue to flash, in the event of failure of the controller. In this case, it is preferably proposed that a synchronous clock is retained for the wind farm, that is to say for further aircraft beacon devices of further wind power installations in the same wind farm.

A controller having at least 25 ppm is preferably used. Known parameters of previous aircraft beacon devices can be retained. The operation previously carried out without intensity can now be achieved in the same manner with control if the intensity is set to 100%. It is easily possible to change over between the daytime beacon and the night-time beacon.

A mechanical structure which can be adapted and provides cable bushings is proposed as particularly advantageous. Weatherproof plugs are preferably used and aircraft beacon lights used are designed to be able to be stacked.

A plurality of light circuits, in particular for 90° areas, are preferably provided. Corresponding sectors can therefore be connected or disconnected. In particular, the use of the positioning pin 952 and positioning hole 954 described in FIGS. 9 and 10 makes it possible to fix the corresponding light circuits, with the result that light is also emitted into the accordingly desired sectors with appropriate control.

An ambient brightness can preferably be measured, for which purpose a brightness sensor can be arranged on the inside and/or a brightness sensor can be arranged on the outside, based on the nacelle or based on a beacon light.

Cooling is preferably provided via a piezo ceramic. Accordingly, the cooling can also be influenced by means of control.

The following are provided as parameters for reading out in order to be able to use them for diagnosis:
operating temperature,
remaining service life,
operating current, operating voltage,
the type of light present,
an existing identification number of the relevant light for identification in a goods management program, in particular an SAP number,
a revision number,
the previously run operating hours,
any error codes, and
an ambient brightness, both inside and outside, based on the beacon light.

The following parameters can be provided for operation and can be retrieved and influenced, namely the following, in particular:
the transfer of the date and time, which can be used to recalculate a switch-on time without a master, in particular if the central control unit or a connection to the latter fails;
a reaction time to an intensity or intensity change;
a structure which can be used to switch each light circuit independently of the others;
the intensity of each light circuit can preferably be changed.

Separate light circuits which can be controlled separately are particularly preferably provided in a beacon light for different emission sectors. However, their intensity can also be changed. A parameter can provide information relating to the corresponding status or the corresponding setting and the setting can be made using such a parameter.

the invention claimed is:

1. An aircraft beacon device for a wind power installation having a nacelle and a tower supporting the nacelle, the aircraft beacon device comprising:
    a plurality of beacon lights of a respective beacon body, the plurality of beacon lights being individually exchangeable and each configured to be replaced with a beacon light of another beacon body, the plurality of beacon lights of the respective beacon body are placed on top of each other in the form of a stack, and adjacent beacon lights of the plurality of beacon lights are configured to be respectively connected to one another;
    a central control unit for individually controlling the plurality of beacon lights; and
    a transmission system having:
        an energy distribution system for individually supplying electrical energy to the plurality of beacon lights to operate the plurality of beacon lights, and
        a data bus system for individually controlling the plurality of beacon lights, the data bus system being configured to carry control data between the central control unit and the plurality of beacon lights.

2. The aircraft beacon device according to claim 1, wherein the central control unit is arranged in an interior of nacelle of the wind power installation.

3. The aircraft beacon device according to claim 1, wherein:
    the plurality of beacon lights are connected to form the respective beacon body, and wherein the aircraft beacon device comprises two or more beacon bodies including the respective beacon body and the other beacon body.

4. The aircraft beacon device according to claim 3, wherein at least one beacon light of the plurality of beacon lights or at least one beacon body of the two or more beacon bodies is configured to be controlled using control commands received over the data bus system and is configured to continue to operate autonomously in an event of an interruption in the data bus system according to a last command or according to a control program stored in the at least one beacon light or at least one beacon body.

5. The aircraft beacon device according to claim 3, wherein:
    at least one beacon light of the plurality of beacon lights has a passage opening that runs vertically and completely through the at least one beacon light and in which at least one connection plug for connecting at least one cable of the energy distribution system and/or for connecting at least one cable of the data bus system is arranged,
    a beacon body of the two or more beacon bodies has a passage opening, and passage openings of the plurality of beacon lights are combined to form a common cable duct.

6. The aircraft beacon device according to claim 1, wherein the data bus system is a non-addressable bus system.

7. The aircraft beacon device according to claim 1, wherein the plurality of beacon lights includes at least one of the list of elements of:
    at least one upper beacon light configured to be arranged on the nacelle,
    at least one first beacon body having a plurality of upper beacon lights and configured to be arranged on the nacelle,
    at least one lateral beacon light configured to be arranged on the tower,
    at least one additional beacon light configured to be arranged on the nacelle,
    at least one second beacon body configured to be arranged on the nacelle, and
    at least one visual range measuring device.

8. The aircraft beacon device according to claim 7, wherein at least one of the list of elements is connected to the central control unit independently of at least one other one of the list of elements.

9. The aircraft beacon device according to claim 7, wherein a plurality of or all elements of the list of elements are each connected to respectively identical sockets via lines having an identical plug, wherein plugs of the respective lines are exchangeable between the respective socket.

10. The aircraft beacon device according to claim 7, wherein a plurality of or all elements of the list of elements each have a combined energy transmission connection and a data transmission connection in a cable with a common plug.

11. The aircraft beacon device according to claim 1, wherein at least one of: a central energy supply unit or the central control unit transmits electrical energy for operating the aircraft beacon device or control data to the plurality of beacon lights using at least one distribution device.

12. The aircraft beacon device according to claim 1, wherein at least one of the plurality of beacon lights is subdivided into a plurality of individual sectors and is configured to emit light substantially horizontally covering a 360° span, and be controlled via the data bus system so as to emit light in one or more of the plurality of individual sectors or covering a 360°, 270°, 180° or 90° span.

13. The aircraft beacon device according to claim 1, wherein at least one of the plurality of beacon lights is configured to:
    emit light with a plurality of different characteristics, and
    be controlled via the data bus system so as to emit light according to one of the plurality of different characteristics.

14. The aircraft beacon device according to claim 1, wherein a remaining service life of one, a subset of or all of the plurality of beacon lights is obtained.

15. A wind power installation having the aircraft beacon device according to claim 1.

16. A method for controlling an aircraft beacon device, comprising:
- individually controlling, by a central control unit, a plurality of beacon lights of the aircraft beacon device, the plurality of beacon lights being of a respective beacon body, the plurality of beacon lights being individually exchangeable and each configured to be replaced with a beacon light of another beacon body, the plurality of beacon lights of the respective beacon body are placed on top of each other in the form of a stack, and adjacent beacon lights of the plurality of beacon lights are configured to be respectively connected to one another,
- individually supplying, by an energy distribution system, electrical energy to the plurality of beacon lights to operate the plurality of beacon lights, and
- carrying, by a data bus system communicatively coupled between the central control unit and the plurality of beacon lights, control data for individually controlling the plurality of beacon lights.

* * * * *

UNITED STATES PATENT AND TRADEMARK OFFICE
CERTIFICATE OF CORRECTION

Page 1 of 1

PATENT NO. : 10,197,043 B2
APPLICATION NO. : 15/773942
DATED : February 5, 2019
INVENTOR(S) : Stephan Harms et al.

It is certified that error appears in the above-identified patent and that said Letters Patent is hereby corrected as shown below:

On the Title Page

Item (87) PCT Publication Date:
"March 11, 2017" should read, --May 11, 2017--

Signed and Sealed this
Fourteenth Day of April, 2020

Andrei Iancu
*Director of the United States Patent and Trademark Office*